United States Patent

Shu et al.

[11] Patent Number: 5,841,951
[45] Date of Patent: Nov. 24, 1998

[54] INK DUTY-CYCLE CONTROL

[75] Inventors: Joseph S. Shu, San Jose; Chia-Hsin Li, Mountain View, both of Calif.

[73] Assignee: Seiko Epson Corporation, Tokyo, Japan

[21] Appl. No.: 641,684

[22] Filed: May 2, 1996

Related U.S. Application Data

[60] Provisional application No. 60/011,437 Feb. 19, 1996.
[51] Int. Cl.$^6$ ........................................... G06F 15/00
[52] U.S. Cl. .................... 395/109; 358/501; 358/521; 358/523
[58] Field of Search ..................... 395/109, 108, 395/107, 101; 358/501, 502, 504, 518, 520, 523, 521, 534, 535, 536, 455, 456, 457, 458, 459, 460, 465, 466, 298; 382/162, 163, 167

[56] References Cited

U.S. PATENT DOCUMENTS

| | | | |
|---|---|---|---|
| 4,920,501 | 4/1990 | Sullivan et al. | 358/458 |
| 5,515,479 | 5/1996 | Klassen | 395/109 |
| 5,517,335 | 5/1996 | Shu | 358/518 |
| 5,557,709 | 9/1996 | Shu | 395/109 |
| 5,594,839 | 1/1997 | Shu | 395/109 |
| 5,684,932 | 11/1997 | Shu | 395/109 |
| 5,768,411 | 6/1998 | Shu et al. | 382/162 |

*Primary Examiner*—Edward L. Coles
*Assistant Examiner*—Dov Popovici
*Attorney, Agent, or Firm*—Mark P. Watson

[57] ABSTRACT

To impose a total-ink duty-cycle limitation by an ink-jet printer that substitutes black ink for simultaneous occurrences of cyan, magenta, and yellow, a printer driver determines a component-value adjustment as a function of the difference between a color's maximum and average component values. Adjusting the color values when this quantity is high but not when it is low enables one to prevent violation of the total-ink duty-cycle limit without unduly limiting black-ink use.

80 Claims, 8 Drawing Sheets

INK DUTY-CYCLE CONTROL

RELATED APPLICATIONS

This application claims the benefit under 35 U.S.C. 119 (e) of U.S. Provisional Application Ser. No. 60/011,437, filed on Feb. 9, 1996, by Joseph Shu, Chia-Hsin Li, and Jack Boyce for IMPROVED HALFTONING APPARATUS AND METHOD THEREOF, which we hereby incorporate by reference. Applicants also incorporate by reference the following commonly assigned co-pending patent applications:

U.S. patent application Ser. No. 08/607,074 of Joseph Shu and Chia-Hsin Li, filed on Feb. 26, 1996, for GENERATING COLOR-CORRECTION LOOK-UP-TABLE ADDRESSES BY MULTI-LEVEL HALF-TONING, Assignee's docket no. AP016.

U.S. patent application Ser. No. 08/607,073 of Joseph Shu and Chia-Hsin Li, filed on Feb. 26, 1996, for CLUSTERED-DOT DITHER WITH WHITE-FLECK SUPPRESSION, Assignee's docket no. AP018.

U.S. patent application Ser. No. 08/607,071 of Joseph Shu and Chia-Hsin Li, filed on Feb. 26, 1996, for BANDING NOISE REDUCTION FOR CLUSTERED-DOT DITHER, Assignee's docket no. AP019.

U.S. patent application Ser. No. 08/607,075 of Joseph Shu and Chia-Hsin Li, filed on Feb. 26, 1996, for DISPERSED-DOT DITHER WITH IMPROVED LIGHT-COLOR SMOOTHNESS, now U.S. Pat. No. 5,768,411, issued on Jun. 16, 1998.

BACKGROUND OF THE INVENTION

The present invention is directed to ink-jet printers and in particular to mechanisms for controlling the duty cycle with which they apply ink.

A digitally expressed image is quite often stored or expressed as three-dimensional color values associated with respective picture elements ("pixels") that in combination make up the image. The three components of the vector color value typically represent red, green, and blue, respectively: they correspond to the red, green, and blue phosphors on a typical computer monitor. This type of representation is sometimes referred to as a positive-color representation: zero values for all three components of the color represent black, the absence of color, which results on the computer monitor when no phosphors are excited.

In contrast, the imaging agent in a printer typically operates in a negative-color mode: the absence of ink (or some other imaging agent) yields the white of the paper, and application of cyan, magenta, and yellow to the paper subtract red, green, and blue, respectively, from the white background. For example, this means that the red and green components in an image's maximum-yellow region will be maximum and its blue-component value will be zero. So if the components are stored with eight-bit resolution, the values stored for the maximum-yellow region will be (255, 255, 0).

Often, a typically software-implemented printer driver converts the stored red-green-blue ("RGB") representation to a cyan-magenta-yellow ("CMY") representation, in which the yellow component has a maximum and the cyan and magenta components are zero. The result is that the printer applies a yellow ink to all pixels in the maximum-yellow region, resulting in a 100% local duty cycle. (Since most printers are binary, being capable only of either applying the yellow dot at a pixel or not, different intensities are rendered by half-toning, in which different intensities are rendered by different percentages of pixels that receive dots, i.e., by different ink duty cycles.)

But this 100% duty cycle is not acceptable for some media. For example, although a 100% duty cycle would be acceptable on certain types of paper, such a high duty cycle would cause the ink to run on other, typically coated paper types. Running is also common on transparencies when such high duty cycles are employed. For this reason, the printer driver is often provided with the capability of accepting information concerning the type of medium on which the image is to be displayed and of limiting the duty cycle accordingly.

Although the printing agents employed correspond to the components of the color's CMY representation, limits on their use are typically imposed by adjusting the RGB values from which the CMY values are determined. At its simplest, this is a relatively straightforward procedure, as can be appreciated by reference to FIG. 1, which is a representation of the RGB color space. The origin K represents pure black. One of the horizontal axes represents various intensities of red, increasing to the maximum-red value R. A second horizontal axis similarly represents green, while the vertical axis represents blue.

FIG. 1 complementarily also represents the CMY color space. Opposite the black origin K is the white origin W of the CMY color space. Cyan, magenta, and yellow axes extend anti-parallel to the red, green, and blue axes. If we assume a maximum component value of 255, this graphically depicts the relationship among the various components' values:

$$\begin{pmatrix} r \\ g \\ b \end{pmatrix} = \begin{pmatrix} 255 \\ 255 \\ 255 \end{pmatrix} - \begin{pmatrix} c \\ m \\ y \end{pmatrix}$$

Together with FIG. 1, this equation reveals that limiting the yellow-ink duty cycle to a fraction $f_1$, of the maximum total intensity is readily achieved on the RGB domain by restricting the blue-component values to $255(1-f_1)$. The duty cycles for the cyan and magenta inks can similarly be limited by requiring minimum values for red and green, respectively. In other words, any time a raw RGB component value is less than $255(1-f_1)$, it can simply be set to that value. Only slightly more elaborate is an approach that linearly compresses the incoming 255—value range to the $255f_s$—value range and thereby reduces the information loss in the darker-color regions.

This type of limit effectively controls the duty cycle for a single ink, but it is often found desirable additionally to impose a total-ink limit, which merely imposing the single-ink limit on the individual components does not necessarily meet. Unlike the single-ink duty cycle, the total-ink duty cycle depends on all of the components together. For that and another reason its implementation is beset with certain complexities. The other reason is that the cyan, magenta, and yellow inks in most cases are not the only ones employed to render the stored RGB-expressed image.

If a straight line were drawn in FIG. 1 between the black and white origins K and W, it would contain only gray values; equal values of all components, whether in the RGB domain or the CMY domain, yield various shades of gray. To render these values, the printer driver typically directs the printer to employ various duty cycles of black ink, to the exclusion of the cyan, magenta, and yellow components that the drawing suggests. Of course, this substitution complicates the relationship between color and the amount of ink applied. So imposing the total-ink duty cycle without excessively limiting the range of colors that the system can render would seem to require a complicated computation step or a large, three-dimensional look-up table.

SUMMARY OF THE INVENTION

But we have developed a technique for imposing the total-ink duty cycle that requires only a minimum of computation and, preferably, only a single-dimension look-up table. In accordance with our invention, a total-ink-limiting adjustment to two of a color's components is determined as a function simply of the difference between the color's maximum and average component values. Not only does this approach take into account the effects of black-ink use on total duty cycle, but it can readily be combined with imposition of a single-ink duty cycle in such a way as to maximize color-information retention despite the duty-cycle limitation.

BRIEF DESCRIPTION OF THE DRAWINGS

The invention discussion below refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of nominal colors or gray-scale values, and the dedicated circuitry can be designed to convert the requested values to values limited in accordance with the characteristics of the printing procedure currently in use. But the invention will more typically be implemented by a general-purpose machine, such as a personal computer operating as a printer driver, whose purpose is to convert an image expressed in nominal color values into display-device commands that comply with specified printer- and medium-dependent limitations.

Figure 2:
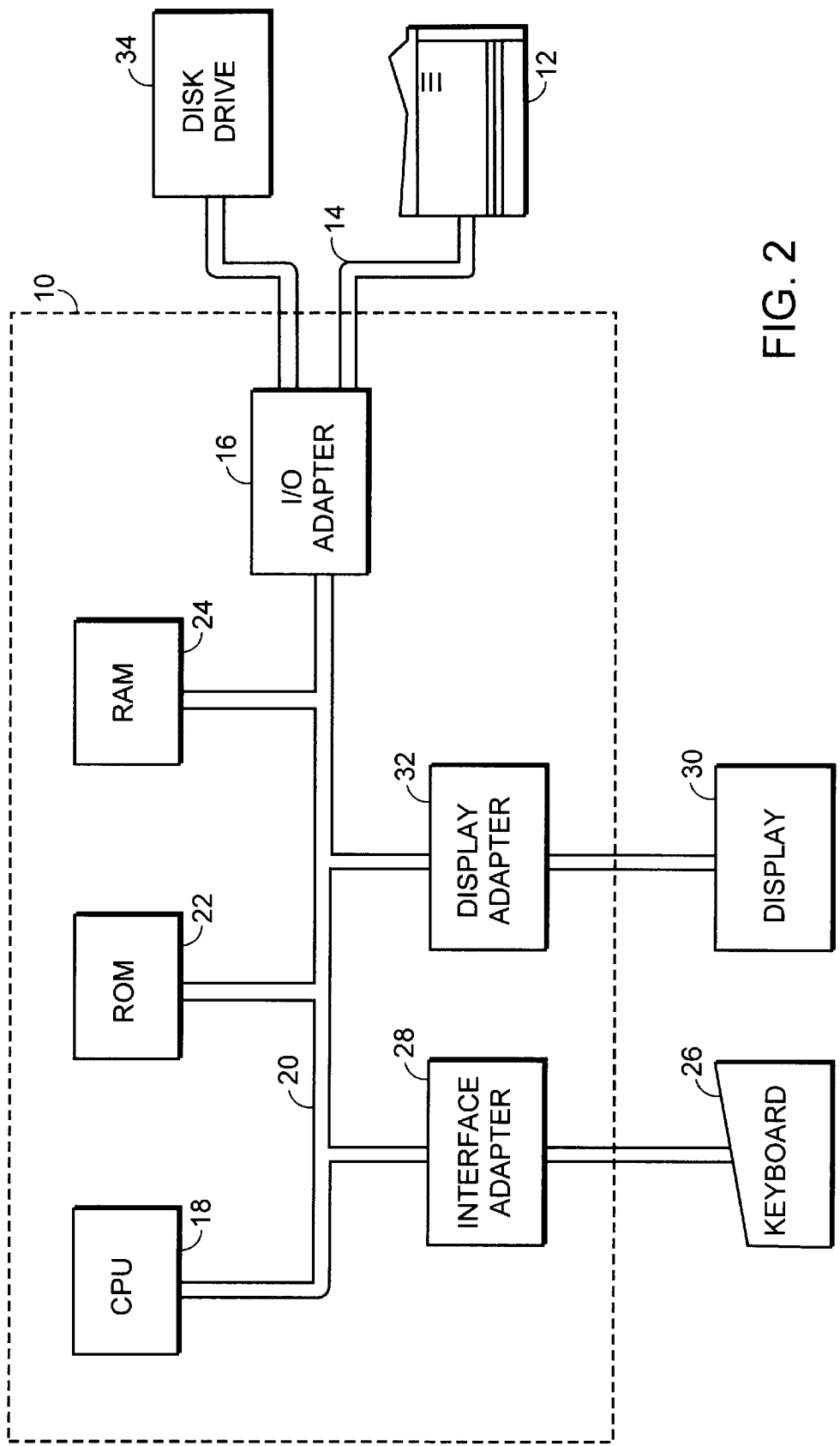
FIG. 2 is a hardware-perspective block diagram of a computer system of the type in which the present invention's teachings will most typically be practiced.

FIG. 2 depicts a typical hardware environment. A personal computer 10 sends a display device such as an ink-jet printer 12 low-level instructions, i.e., instructions that specify which individual display-medium pixels should receive dots. The drawing depicts the printer 12 as receiving these instructions by way of an appropriate channel 14. Computers that are capable of practicing the present invention come in a wide variety of configurations, and FIG. 2 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and read-write memories 22 and 24. FIG. 2 also depicts the computer 10 as communicating, as is typical, with a keyboard 26 by way of an interface adapter 28. FIG. 2 also shows the usual cathode-ray-tube display 30 coupled to the central processing unit 18 by a display adapter 32.

In the typical situation, the computer 10 implements the present invention's teachings when it functions as a printer driver. The instructions that configure the computer to perform this function are usually included in the operating-system software transferred to the computer's disc drive 34 and stored in a disc that the drive contains. Often, the driver software will have been loaded into the computer system from another storage medium, such as a diskette or CD-ROM. In any event, the computer 10 reads the printer driver instructions from the disc drive in most cases and then performs the below-described functions to implement the present invention's teachings.

Figure 3:
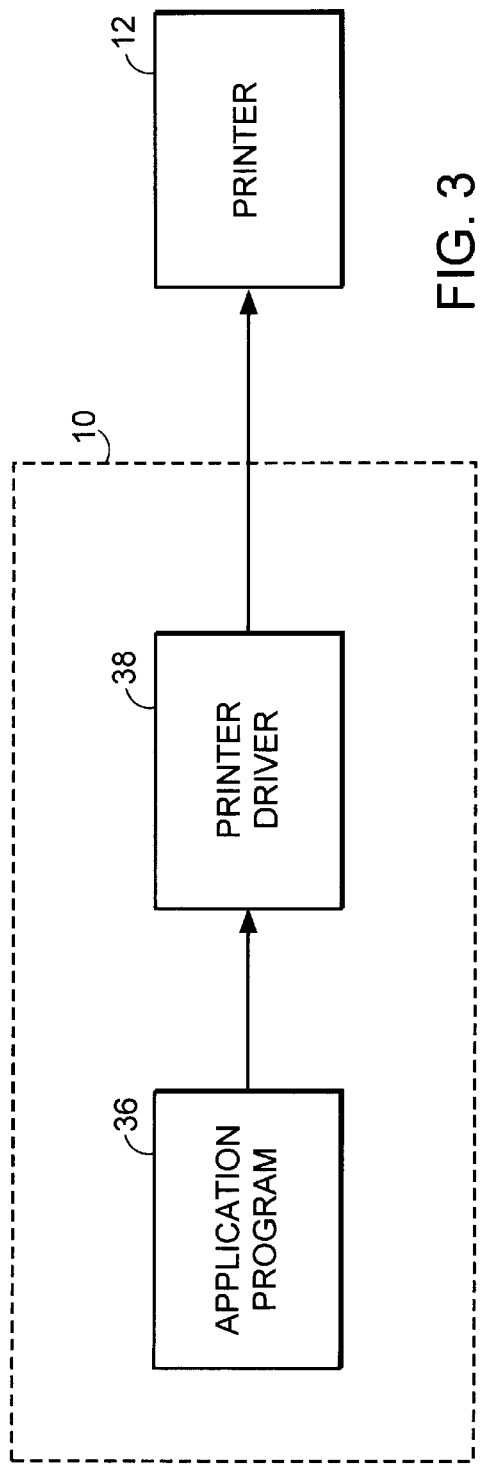
FIG. 3 is a software-perspective block diagram of the same environment.

FIG. 3 depicts the typical situation from more of a software standpoint. Typically, the present invention's teachings will come into play when the computer 10 is operating a user's application program 36 and that program makes a system call requesting that an image be printed. The requested operation is carried out by a printer driver 38, which is usually considered to be part of the operating system but is specific to the designated printer. The printer driver's purpose is to convert a device-independent representation of the image into low-level printer instructions to the printer that will renderthat image as faithfully as the printer's limitations permit.

As was mentioned above, the use of black ink in place of a combination of cyan, magenta, and yellow for some colors results in application of less ink than the cyan, magenta-yellow combination would. If black ink were never substituted for the cyan, magenta-yellow combination, the total applied ink would increase steadily as the color space is traversed from the CMY origin W toward the RGB origin B. This would make the RGB origin K the color of greatest ink application: the cyan, magenta, and yellow components all have maximum values at that point. But unless a single-ink duty-cycle limit is also imposed, the total ink-duty cycle can be observed in ordinary practice without avoiding that color, since a single, black ink dot is usually substituted for the three-dot, cyan, magenta, and yellow combination for which that color ostensibly calls.

Figure 1:
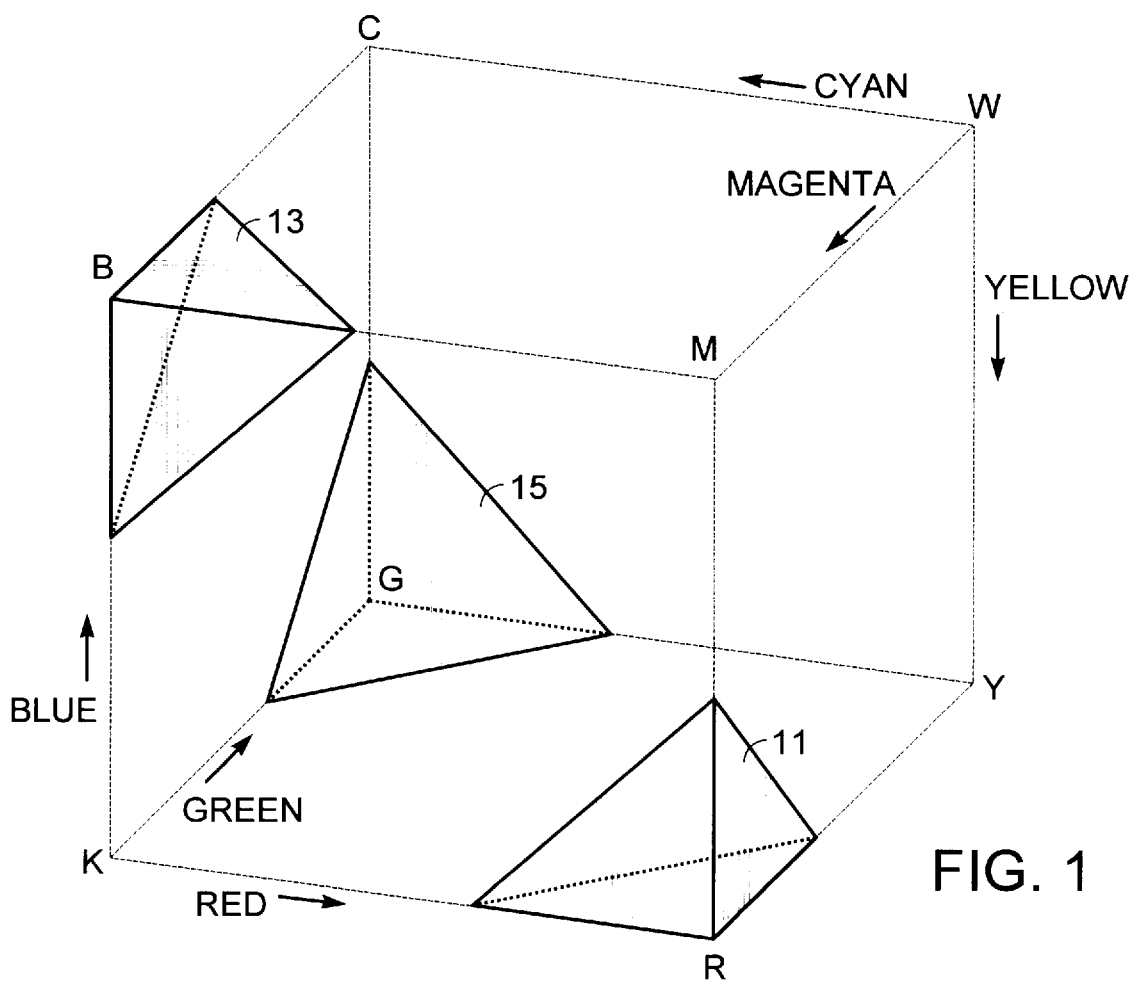
FIG. 1, referred to above, is a plot of the RGB and CMY color spaces.

As one can conclude from a perusal of FIG. 1, however, black-ink substitution does not affect the maximum-red color R: although its magenta and yellow components are maximum, its cyan value is zero, so there can be no cyan-magenta-yellow combinations for black to displace.

The maximum-red color R is therefore likely to run afoul of any significant total-ink-duty-cycle limit, and the same is true of the maximum-blue and-green colors B and G.

The purpose of the color conversion to be described below is therefore to prevent the occurrence of colors within pyramids 11, 13, and 15 in FIG. 1, replacing colors disposed in those pyramids with colors that are not. We have discovered that this result is readily achieved by adding to two of the RGB components an adjustment value that is determined, either algorithmically or by way of a small, one-dimensional look-up table, simply as a function of the difference between the uncorrected color's highest and average RGB-component values.

Figure 4:
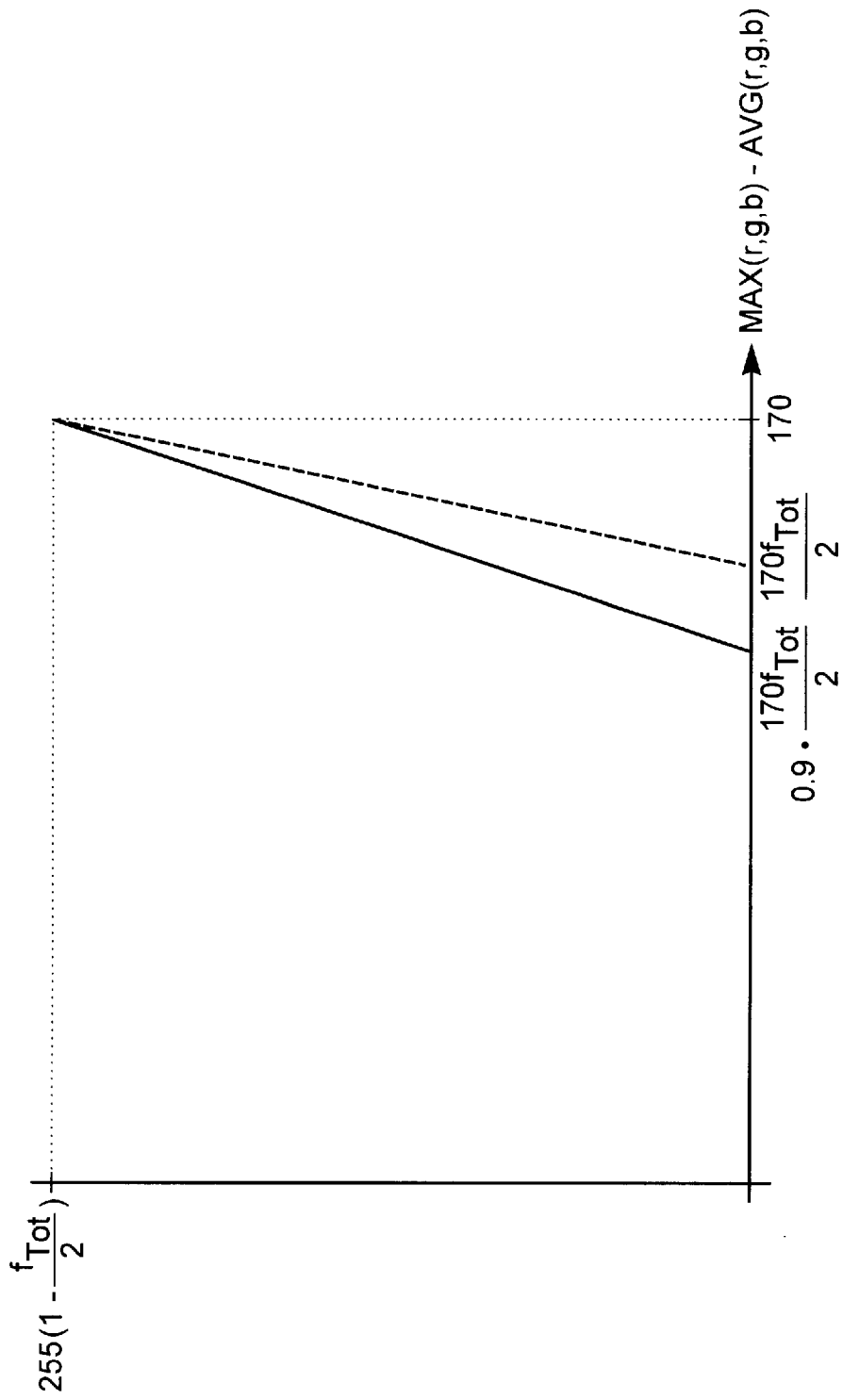
FIG. 4 is a plot of component-adjustment values as a function of the difference between a color's maximum and average component values.

FIG. 4 depicts the adjustment-value function that we employ. In FIG. 4, the horizontal axis represents the amount by which the unlimited color's highest-value component exceeds its components' average, and the vertical axis represents the amount that is to be added to both of the other, non-maximum components' values to yield the adjusted value, i.e., a value that no longer is in one of the pyramids 11, 13, and 15 of FIG. 1.

To understand the function's effects, first consider a maximum-total-ink-duty-cycle example, namely, the maximum-red color R, whose RGB component-value combination is (255, 0, 0). Clearly, the difference between the maximum component value, 255, and the component-value average, 85, is 170, so 170 is the top end of that difference-value range. Therefore, the maximum abscissa value in FIG. 4 is 170.

Now, suppose that we need to impose a total-ink-duty-cycle limit of $255 f_{Tot}$, where $f_{Tot}$ is, say, 1.6. Since the actual imaging agents being applied correspond to CMY values, the total of the CMY component values should not exceed $255 \times 1.6 = 408$. But the CMY component values' total for maximum red—i.e., for (0, 255, 255) in the CMY domain—is $0+255+255=510$, which exceeds the limit of 408.

To abide by that limit, we substitute for maximum red a value whose components add only to 408. For instance, we can replace (0, 255, 255) with (0, 204, 204). This reduces the component-value total by the difference between the total-ink limit and the uncorrected component-value total. Note that we have achieved this by subtracting half of that difference from the magenta value and half from the yellow value. For maximum red, that is, $$\begin{pmatrix} c' \\ m' \\ y' \end{pmatrix} = \begin{pmatrix} 0 \\ 255 \\ 255 \end{pmatrix} - \begin{pmatrix} 0 \\ \frac{0+255+255-255 \cdot f_{Tot}}{2} \\ \frac{0+255+255-255 \cdot f_{Tot}}{2} \end{pmatrix} = \begin{pmatrix} c \\ m \\ y \end{pmatrix} - \begin{bmatrix} 0 \\ 255 \cdot \left(1 - \frac{f_{Tot}}{2}\right) \\ 255 \cdot \left(1 - \frac{f_{Tot}}{2}\right) \end{bmatrix}$$

By reviewing FIG. 1, we see that subtracting an adjustment value from the magenta and yellow components is equivalent to adding that same value to the green and blue components, so the adjustment required for maximum red in the RGB domain is given by:

$$\begin{pmatrix} r' \\ g' \\ b' \end{pmatrix} = \begin{pmatrix} r \\ g \\ b \end{pmatrix} + \begin{bmatrix} 0 \\ 255 \cdot \left(1 - \frac{f_{Tot}}{2}\right) \\ 255 \cdot \left(1 - \frac{f_{Tot}}{2}\right) \end{bmatrix}$$

In the FIG. 4 plot of adjustment value as a function of the difference between the RGB-component-value maximum and average, the ordinate value for the abscissa value 170, which corresponds to maximum red (or maximum green or maximum blue) is therefore $255(1-f_{Tot}/2)$. This is the quantity that should be added to the other two RGB components when the difference between the maximum-value component and all three components' average is the maximum possible value, i.e., 170.

Clearly, the required adjustment decreases as the excess of the maximum over the average does, until some point at which no further adjustment is necessary. To determine that point, we choose a CMY value whose total equals the limit, i.e., $255 f_{Tot}$. A reddish value that meets this criterion is (c, m, y) = (0, $255 f_{Tot}/2$, $255 f_{Tot}/2$). In RGB space, that color is given by:

$$\begin{pmatrix} r \\ g \\ b \end{pmatrix} = \begin{bmatrix} 255 \\ 255 \cdot \left(1 - \frac{f_{Tot}}{2}\right) \\ 255 \cdot \left(1 - \frac{f_{Tot}}{2}\right) \end{bmatrix},$$

for which $$\text{Max}(r,g,b) - \text{Avg}(r,g,b) = 255 - \left[ \frac{255 + 255 \cdot \left(1 - \frac{f_{Tot}}{2}\right) + 255 \cdot \left(1 - \frac{f_{Tot}}{2}\right)}{3} \right] = \frac{255 f_{Tot}}{3} = \frac{170 f_{Tot}}{2}$$

That is, if the difference between an uncorrected color's maximum and its average component values is $170 f_{Tot}/2$ or less, we do not consider it to exceed the total-ink-duty limit. Accordingly, one could employ the adjustment-value function that the dashed line in FIG. 4 represents.

Figure 5:
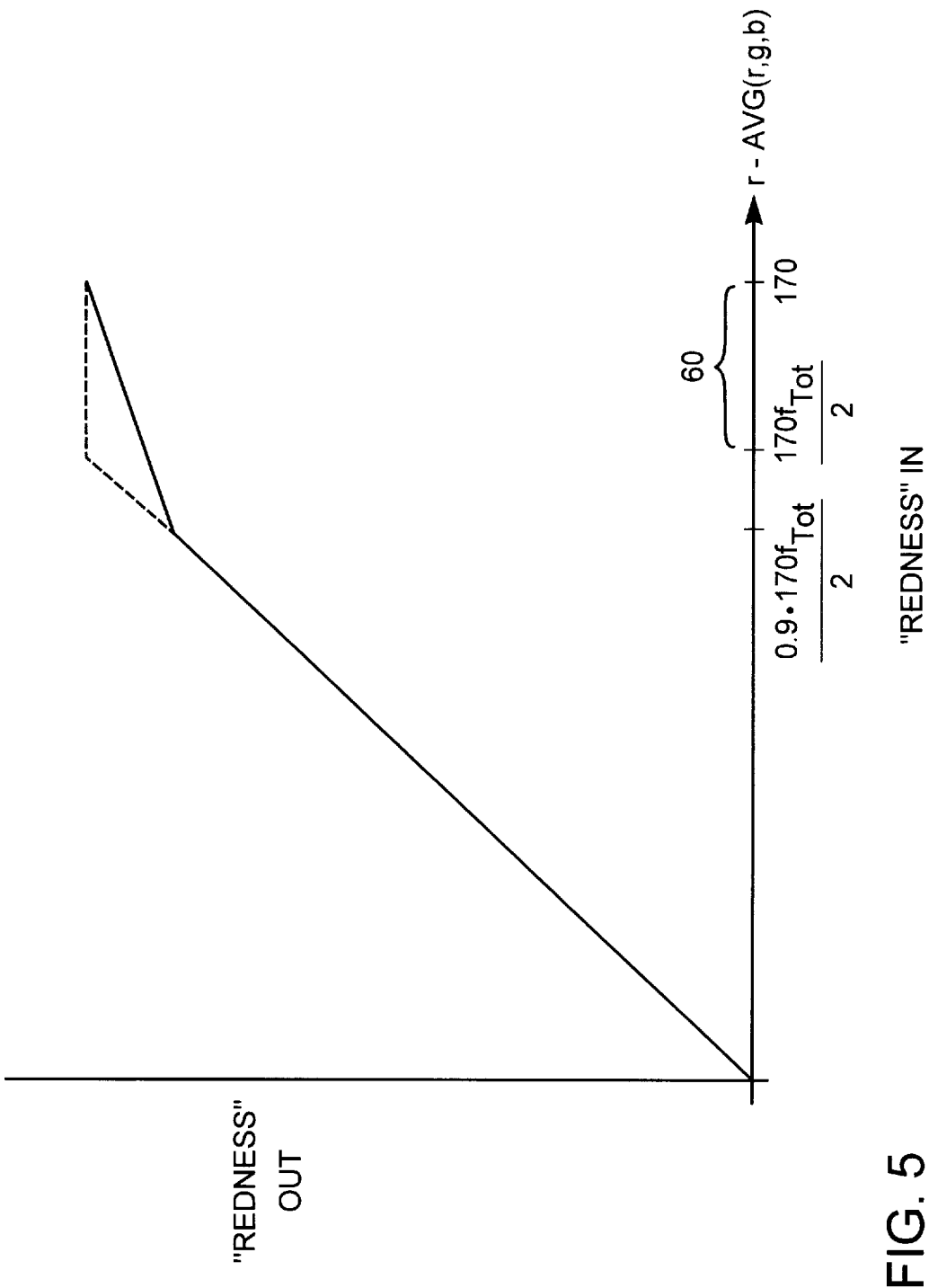
FIG. 5 is a plot of the difference between an adjusted color's maximum and average component values as a function of the corresponding quantity for the uncorrected color value from which it is determined.

But we instead employ a function represented by the solid line in FIG. 4, for reasons that will now be explained by reference to FIG. 5. In FIG. 5, we assume for the sake of concreteness that all color values being considered have a red component of 255 but may have different values in the other components. In other words, the color is somewhere in the magenta-yellow plane of FIG. 1. If the other two RGB components are zero, then the color is the maximum red that point R represents in the illustrated color space, and the "redness" is greatest. As the values of the other components increase, the color point moves in the magenta-yellow plane away from the maximum-red point R, and the difference between the maximum component (i.e., the red component) and the average of all RGB components decreases, indicating less redness.

FIG. 5's horizontal axis represents the uncorrected redness, i.e., the redness of the pixel values before ink limiting, while the vertical axis represents the corrected redness, i.e., the redness that remains after the ink-duty-cycle limit has been imposed. If the dashed-line function of FIG. 4 were employed, then no adjustment would be made for any pixel value whose redness—and "blueness" and "greenness"—are below $170f_{Tot}/2$, and all uncorrected values whose redness (or blueness or greenness) is above that would be corrected just enough to comply with the limit. FIG. 5's dashed-line curve represents the result: the whole range of colors represented in FIG. 5 by the interval 60 between $170f_{Tot}/2$ and 170 would all be "corrected" to the same degree of redness. In other words, information intended to be imparted by variations within this range would be lost. (Not all of that variation information is lost: in FIG. 1, different colors pyramid 11's magenta-yellow-plane face would not in general be mapped to the same color on that pyramid's magenta-yellow-plane diagonal edge. Still, all of that face's colors would be mapped to some color on that edge, so variation in what we have call "redness" would be lost.)

To preserve some of this information and yet observe the total-ink duty-cycle limit, we instead choose a function that FIG. 4's solid-line curve represents. Its non-zero adjustment values start at 90% of $170f_{Tot}/2$ rather than at $170f_{Tot}/2$ itself. FIG. 5's solid-line curve represents the resultant mapping of input redness to output redness. That curve reveals that the illustrated function preserves to an extent the variation information in the uncorrected image: to the extent that color-value resolution permits, input-redness variations always result in output-redness variations.

Although the present invention's advantages are not limited to embodiments that employ the illustrated adjustment function, we have obtained good results with it. Also, the two non-maximum components do not have to receive the same adjustment—and the maximum component can be adjusted, too—so long as the sum of all the adjustments is twice the value that the adjustment function yields. Still, the illustrated approach has the virtue of simplicity, and it yields satisfactory results.

Figure 6:
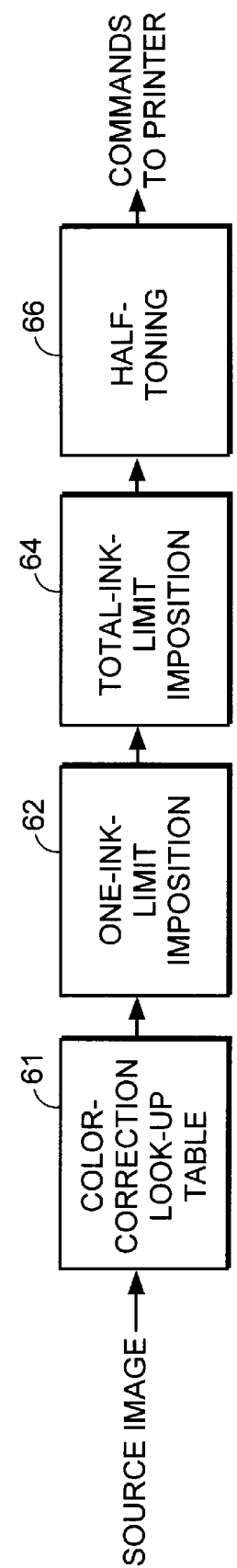
FIG. 6 is a block diagram depicting the position of the present invention's total-ink duty-cycle adjustment in an exemplary sequence of image-processing steps.

So far, we have not discussed this method's relationship to imposition of an additional, single-ink duty-cycle limit. But the invention will more typically be practiced in concert with a single-ink limit. FIG. 6 shows this conceptually: possibly after other processing 61 to compensate for ink-color-fidelity limitations, a step represented by block 62 modifies uncorrected RGB-expressed colors to yield output colors that comply with a one-ink duty-cycle limit. It is these resultant, modified RGB values on which a method similar to the one discussed above imposes the total-ink duty-cycle limit, as block 64 indicates. The printer is then operated in accordance with the resultant images, although the actual printer instructions typically result from further image modification in processing represented by block 66. For instance, the further processing may include conversion to the CMY domain and halftoning to produce levels that are compatible with the printer's typically binary (ink or no ink) operation.

Figure 7:
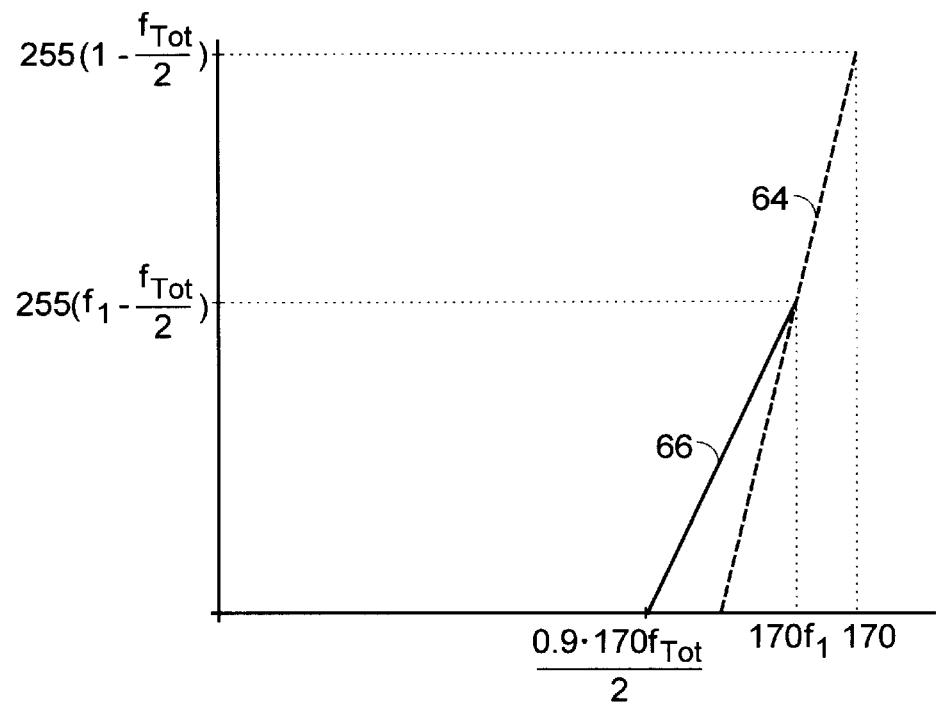
FIG. 7 is a plot similar to FIG. 4 of an adjustment-value function that takes advantage of a previously imposed single-ink-duty-cycle limit.

When the present invention is used in concert with imposition of a single-inkduty-cycle limitation, we take advantage of the preceding operation's range limitations. Specifically, we replace the adjustment function of FIG. 4 with the modified function that FIG. 7 represents. Whereas the difference between maximum and average component values can be as high as two-thirds (here, 170) of the component-value range (here, 255) in the absence of a prior single-ink duty-cycle limitation, prior imposition of a single-ink duty-cycle limitation $f_1$ reduces that range in proportion to that limit. In the illustrated embodiment, the range would be reduced to a maximum of $170f_1$. That is, if the maximum-red CMY value is reduced to $(0, 255f_1, 255f_1)$ as a result of the single-ink limitation, then the corresponding RGB value is $(255, 255(1-f_1), 255(1-f_1))$, for which $170f_1$ is the difference between the maximum and the average.

Now, these facts do not prevent use of the FIG. 4 function; that function would impose the total-ink duty-cycle limit just as effectively. But the FIG. 4 function (intentionally) reduces ink duty cycle more than the duty-cycle limit requires, because doing so preserves variation information throughout the region in FIG. 4 between $170f_{Tot}/2$ and 170. But if a single-ink limit $255f_1$ has previously been imposed, we know that the adjustment function's domain now extends only to $170f_1$, so we do not have to overcompensate to as great an extent in order to preserve the variation information.

FIG. 7 illustrates this effect. Dashed line 64 represents adjustment values that will cause the corrected values to meet the total-ink duty-cycle limitation exactly, while solid line 66 represents the function that we actually employ. Although the curve-66 function overcompensates throughout a range of values in order to provide variation information, there is no overcompensation at the upper end, $170f_1$, of that function's (single-ink-limit-reduced) domain. Without the single-ink duty-cycle-limit imposition, on the other hand, it is still necessary in FIG. 4 to overcompensate at $170f_1$ since variation information has to be provided all the way up to a value of 170.

Figure 8:
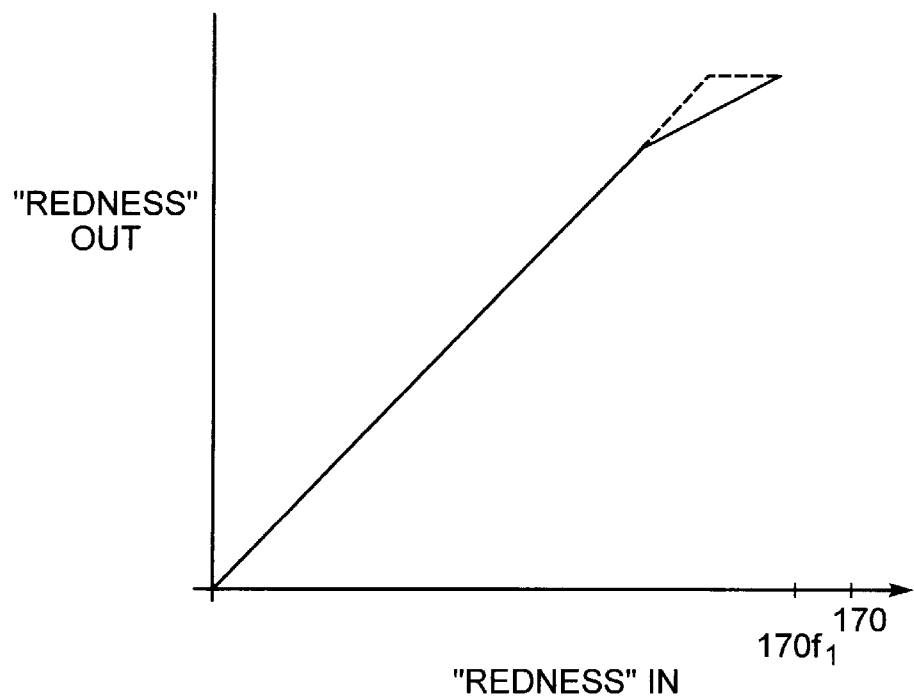
FIG. 8 is a plot of the difference function that results from the FIG. 7 adjustment function.

FIG. 8 shows the input-to-output relationship that results when we thus take advantage of the domain reduction.

The maximum compensation value in the FIG. 7 function was determined by recognizing that the CMY value of the reddest single-ink-limited color is $(0, 255f_1, 255f_1)$. This compensation value $\delta$ is simply half the difference between the CMY-component total and the total-ink limit:

$$\delta = (0 + 255f_1 + 255f_1 - 255f_{Tot})/2 = 255(f_1 f_{Tot}/2).$$

One can apply the limiting function of FIGS. 4 and 7 in many ways. For instance, FIG. 6 suggests a more-or-less "real-time" limit determination. That is, a limit is computed for each color as the image is being processed for printing. As successive pixel values in the image are encountered, they are subjected to processing such as, for instance, color correction of FIG. 6's block 61, which for the real-life inks' departure from their corresponding color components' ideal behavior. The one-ink-limit imposition and total-ink-limit imposition represented by blocks 62 and 64 are similarly performed only when the corresponding values are encountered during processing.

But there are degrees to which the processing is a real-time operation. For example, one can compute the FIG. 7 volume "from scratch" for each input volume in accordance with, say, $$\delta = \mu_{-2}\left[ 255 \cdot \left(f_1 - \frac{f_{Tot}}{2}\right) \cdot \frac{\text{Max}(r,g,b) - \text{Avg}(r,g,b) - 0.9 \cdot \frac{170 \cdot f_{Tot}}{2}}{170 \cdot f_1 - 0.9 \cdot \frac{170 \cdot f_{Tot}}{2}} \right],$$

where $$u_{-2}(x) = \begin{cases} 0, & x < 0 \\ x, & x \geq 0 \end{cases}$$

Figure 9:
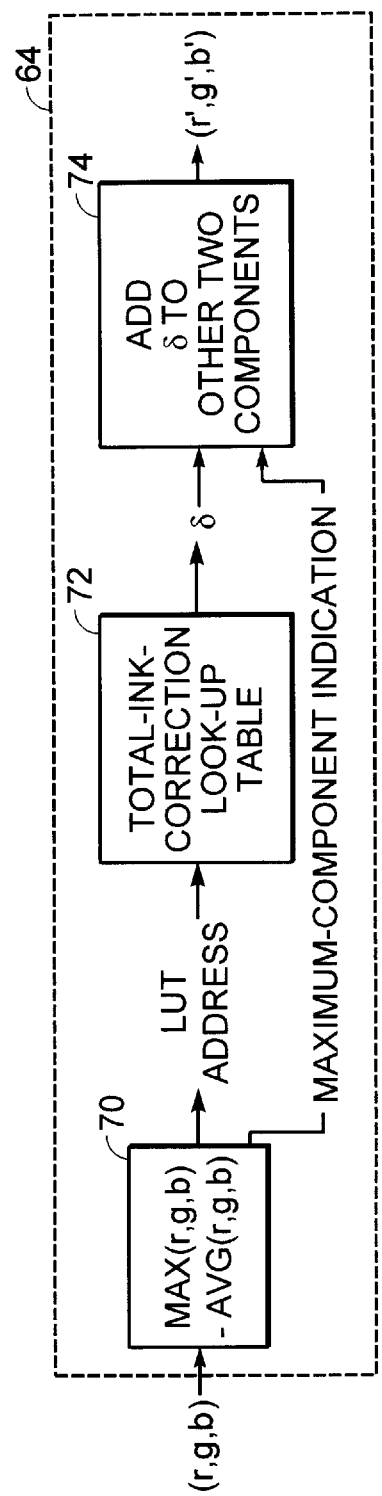
FIG. 9 is a block diagram of a look-up-table implementation of the present invention.

Other real-time approaches may instead compute the difference between the maximum and average values in real time, in a step represented by FIG. 9's block 70, but use the result to address a look-up table 72 that contains pre-computed values.

Indeed, one of the present invention's advantages is particularly manifest in the latter approach. Although calculating the FIG. 7 function in real time can cause significant computation delay, one might nonetheless tend to avoid the faster, look-up table alternative in a color process; since a color value is a three-dimensional vector, look-up-table addresses also tend to be three-dimensional, so the resultant table tends to be large.

But the present invention's teachings lend themselves to implementation by way is of a one-dimensional look-up table; the address is a single quantity, namely, the difference between the maximum and average values. Although that quantity must itself be calculated in real time, that calculation can be performed by a single left shift and two subtractions. (We assume here that the look-up-table address will be three times that difference rather than the difference itself, which can be a fraction.) And once the adjustment value has been determined, in FIG. 9's table-look-up operation 72, determining the adjusted values in operation 74 requires only two additions.

Figure 10:
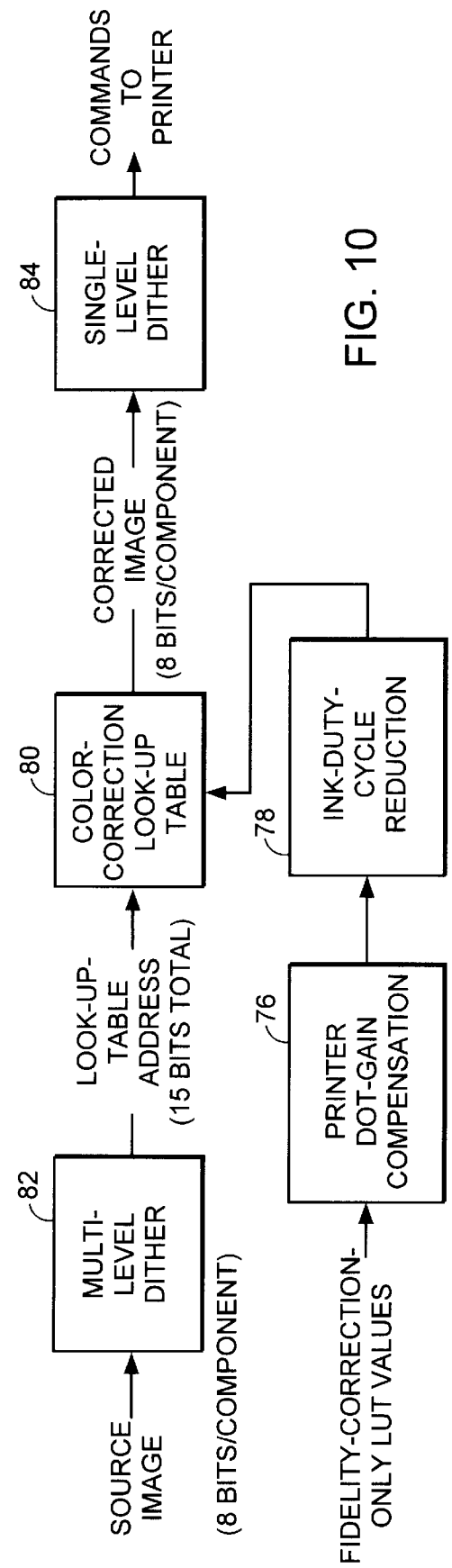
FIG. 10 is a block diagram that depicts the position of the present invention's total-ink duty-cycle adjustment in another sequence of image-processing steps.

Numerous other approaches are also possible. For instance, FIG. 10 depicts a non-real-time approach that employs a look-up table to perform several types of processing simultaneously. In FIG. 10 the contents of a color-fidelity-correction-only look-up table, corresponding to the one that FIG. 6's operation 61 employs, are subjected ahead of time to printer-dot-gain compensation, represented by FIG. 10's block 76, in which those look-up-table values are further adjusted to compensate for certain non-linear effects of the currently employed medium's particular dot size. (Different media absorb ink differently, so different dot sizes result.) FIG. 10's block 78 represents then applying the inkduty-cycle limitation of the present invention to those look-up-table values, again before the display processing is to take place. Operation 78's ink-duty-cycle limitation may consist solely of the present invention's total-ink-limitation operation, or it may additionally include imposition of a single-ink limit. In any event, the resultant look-up-table values, possibly after some further adjustment for other factors, await real-time use in performing color-fidelity corrections, dot-gain-compensation, and ink-duty-cycle reduction simultaneously.

Even in these circumstances, in which the total-ink-limit adjustment is performed in a non-real-time operation 78, one may want to employ a (further, small) look-up table to impose that limit. Since color-fidelity correction is unavoidably a three-dimensional operation, the table employed in step 80 tends to be large. And since the ink-duty-cycle-limitation operation must be performed on all of that large table's contents before it is used for real-time operation, it may be preferable for operation 78, too, to avail itself of a (much-smaller) table look-up's speed benefits even though operation 78 is not a real-time operation.

For a further indication of the wide range of embodiments that can use the present invention's teachings, FIG. 10 gives an example of an embodiment that limits the size of the resultant three-dimensional look-up table by using a multi-level-dither operation 82 of the type described in our above-mentioned co-pending U.S. patent application for Generating Color-Correction Look-Up-Table Addresses by Multi-Level Half-Toning. As that patent application describes in more detail, the look-up table only sparsely samples the color space, but the effect of greater color-value resolution is achieved by using dithering to generate the look-up-table addresses. Alternatively, the sparse sampling can be compensated for by interpolating among the table's corrected-value entries for the uncorrected values closest to the input value. Further processing, such as performance of a single-level-dither operation 84, converts the table-look-up operation 80's outputs to printer commands.

The foregoing description demonstrates that the present invention can be used either alone or in concert with imposition of a single-ink duty-cycle limitation. It can be implemented by table look-up or strictly algorithmically. Its values can be precomputed or computed in real time, and it can be employed in a discrete operation or in a common operation used to achieve other display-processing goals. The present invention can therefore be employed in a wide range of embodiments and thus constitutes a significant advance in the art.

What is claimed is:

1. A method of rendering a source image comprising:
   A) generating, in response to electrical source-image signals representing a source image, electrical print-command signals by employing a sequence of at least one image-revision step, in which sequence each image-revision step receives an input image consisting of input pixels and produces therefrom an output image consisting of output pixels, the first image-revision step's input image is the source image, any subsequent image-revision step's input image is the output image of the preceding image-revision step, one said image-revision step is a total-ink-limiting step whose input image consists of input pixels whose values are represented by RGB components, the difference between the maximum and average component values of at least one of the input pixels of the total-ink-limiting step's input image exceeds a predetermined minimum, and the total-ink-limiting step comprises the steps of:
      i) for each input pixel, computing a difference value proportional to the difference between that input pixel's maximum and average component values and thereby indicative of whether that difference exceeds the predetermined minimum; and
      ii) obtaining an output image by determining, for each input pixel, an output pixel whose value:
         a) equals that input pixel's value if the difference between that input pixel's maximum and average component values does not exceed the predetermined minimum, and,
         b) if the difference between that input pixel's maximum and average component values exceeds the predetermined minimum, results from adding to that input pixel's non-maximum component values respective adjustment values that in total are a function of the difference value computed for that input pixel; and
   B) operating a printing mechanism by applying the print-command signals thereto.

2. A method as defined in claim 1 wherein:
   A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and
   B) the single-ink-limiting step comprises producing an output image consisting of output pixels whose values are represented by RGB components that are all greater than or equal to the predetermined lower limit.

3. A method as defined in claim 1 wherein the value of the output pixel determined in the total-ink-limiting step for a given input pixel results from adding the same adjustment value to both of that input pixel's non-maximum component values if the difference between that input pixel's maximum and average component values exceeds the predetermined minimum.

4. A method as defined in claim 3 wherein the maximum component value of the output pixel determined in the total-ink-limiting step for a given input pixel is the same as the maximum component value of that input pixel.

5. A method as defined in claim 4 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

6. A method as defined in claim 4 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

7. A method as defined in claim 1 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

8. A method as defined in claim 7 wherein the linear function of the predetermined minimum difference value is zero.

9. A method as defined in claim 8 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

10. A method as defined in claim 1 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

11. For operating a printing mechanism to render a source image, an apparatus comprising:
  A) image-revision circuitry responsive to electrical source-image signals representing the source image for performing a sequence of at least one image-revision step, in which sequence each image-revision step receives an input image consisting of input pixels and produces therefrom an output image consisting of output pixels, the first image-revision step's input image is the source image, any subsequent image-revision step's input image is the output image of the preceding image-revision step, one said image-revision step is a total-ink-limiting step whose input image consists of input pixels whose values are represented by RGB components, the difference between the maximum and average component values of at least one of the input pixels of the total-ink-limiting step's input image exceeds a predetermined minimum, and the total-ink-limiting step comprises the steps of:
    i) for each input pixel, computing a difference value proportional to the difference between that input pixel's maximum and average component values and thereby indicative of whether that difference exceeds the predetermined minimum; and
    ii) obtaining an output image by determining, for each input pixel, an output pixel whose value:
      a) equals that input pixel's value if the difference between that input pixel's maximum and average component values does not exceed the predetermined minimum, and,
      b) if the difference between that input pixel's maximum and average component values exceeds the predetermined minimum, results from adding to that input pixel's non-maximum component values respective adjustment values that in total are a function of the difference value computed for that input pixel; and
  B) output circuitry responsive to the image-revision circuitry for applying to the printing mechanism electrical print-command signals that represent the output image produced by the last said image-revision step.

12. An apparatus as defined in claim 11 wherein:
  A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and
  B) the single-ink-limiting step comprises producing an output image consisting of output pixels whose values are represented by RGB components that are all greater than or equal to the predetermined lower limit.

13. An apparatus as defined in claim 11 wherein the value of the output pixel determined in the total-ink-limiting step for a given input pixel results from adding the same adjustment value to both of that input pixel's non-maximum component values if the difference between that input pixel's maximum and average component values exceeds the predetermined minimum.

14. An apparatus as defined in claim 13 wherein the maximum component value of the output pixel determined in the total-ink-limiting step for a given input pixel is the same as the maximum component value of that input pixel.

15. An apparatus as defined in claim 14 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

16. An apparatus as defined in claim 14 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

17. An apparatus as defined in claim 11 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

18. An apparatus as defined in claim 17 wherein the linear function of the predetermined minimum difference value is zero.

19. An apparatus as defined in claim 18 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

20. An apparatus as defined in claim 11 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

21. A printing apparatus comprising:
A) a printing mechanism for applying ink to a medium in accordance with electrical print-command signals applied thereto;
B) image-revision circuitry responsive to electrical source-image signals representing the source image for performing a sequence of at least one image-revision step, in which sequence each image-revision step receives an input image consisting of input pixels and produces therefrom an output image consisting of output pixels, the first image-revision step's input image is the source image, any subsequent image-revision step's input image is the output image of the preceding image-revision step, one said image-revision step is a total-ink-limiting step whose input image consists of input pixels whose values are represented by RGB components, the difference between the maximum and average component values of at least one of the input pixels of the total-ink-limiting step's input image exceeds a predetermined minimum, and the total-ink-limiting step comprises the steps of:
i) for each input pixel, computing a difference value proportional to the difference between that input pixel's maximum and average component values and thereby indicative of whether that difference exceeds the predetermined minimum; and
ii) obtaining an output image by determining, for each input pixel, an output pixel whose value:
a) equals that input pixel's value if the difference between that input pixel's maximum and average component values does not exceed the predetermined minimum, and,
b) if the difference between that input pixel's maximum and average component values exceeds the predetermined minimum, results from adding to that input pixel's non-maximum component values respective adjustment values that in total are a function of the difference value computed for that input pixel; and
C) output circuitry responsive to the image-revision circuitry for applying to the printing mechanism electrical print-command signals that represent the output image produced by the last said image-revision step.

22. A printing apparatus as defined in claim 21 wherein:
A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and
B) the single-ink-limiting step comprises producing an output image consisting of output pixels whose values are represented by RGB components that are all greater than or equal to the predetermined lower limit.

23. A printing apparatus as defined in claim 21 wherein the value of the output pixel determined in the total-ink-limiting step for a given input pixel results from adding the same adjustment value to both of that input pixel's non-maximum component values if the difference between that input pixel's maximum and average component values exceeds the predetermined minimum.

24. A printing apparatus as defined in claim 23 wherein the maximum component value of the output pixel determined in the total-ink-limiting step for a given input pixel is the same as the maximum component value of that input pixel.

25. A printing apparatus as defined in claim 24 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

26. A printing apparatus as defined in claim 24 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

27. A printing apparatus as defined in claim 21 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

28. A printing apparatus as defined in claim 27 wherein the linear function of the predetermined minimum difference value is zero.

29. A printing apparatus as defined in claim 28 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

30. A printing apparatus as defined in claim 21 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

31. A storage medium containing instructions readable by a computer to configure the computer to function as a printer driver for operating a printer to render a source image, which printer driver includes:
A) image-revision circuitry responsive to electrical source-image signals representing the source image for performing a sequence of at least one image-revision step, in which sequence each image-revision step receives an input image consisting of input pixels and produces therefrom an output image consisting of output pixels, the first image-revision step's input image is the source image, any subsequent image-revision step's input image is the output image of the preceding image-revision step, one said image-revision step is a total-ink-limiting step whose input image consists of input pixels whose values are represented by RGB components, the difference between the maximum and average component values of at least one of the input pixels of the total-ink-limiting step's input image exceeds a predetermined minimum, and the total-ink-limiting step comprises the steps of:

i) for each input pixel, computing a difference value proportional to the difference between that input pixel's maximum and average component values and thereby indicative of whether that difference exceeds the predetermined minimum; and ii) obtaining an output image by determining, for each input pixel, an output pixel whose value:

a) equals that input pixel's value if the difference between that input pixel's maximum and average component values does not exceed the predetermined minimum, and, b) if the difference between that input pixel's maximum and average component values exceeds the predetermined minimum, results from adding to that input pixel's non-maximum component values respective adjustment values that in total are a function of the difference value computed for that input pixel; and B) output circuitry responsive to the image-revision circuitry for applying to the printing mechanism electrical print-command signals that represent the output image produced by the last said image-revision step.

32. A storage medium as defined in claim 31 wherein:

A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and B) the single-ink-limiting step comprises producing an output image consisting of output pixels whose values are represented by RGB components that are all greater than or equal to the predetermined lower limit.

33. A storage medium as defined in claim 31 wherein the value of the output pixel determined in the total-ink-limiting step for a given input pixel results from adding the same adjustment value to both of that input pixel's non-maximum component values if the difference between that input pixel's maximum and average component values exceeds the predetermined minimum.

34. A storage medium as defined in claim 33 wherein the maximum component value of the output pixel determined in the total-ink-limiting step for a given input pixel is the same as the maximum component value of that input pixel.

35. A storage medium as defined in claim 34 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

36. A storage medium as defined in claim 34 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

37. A storage medium as defined in claim 31 wherein the output pixel determined for each input pixel if the difference between that input pixel's maximum and average component values exceeds the predetermined minimum results from adding to that input pixel's non-maximum component values respective adjustment values that in total are a linear function of the difference value computed for that input pixel.

38. A storage medium as defined in claim 37 wherein the linear function of the predetermined minimum difference value is zero.

39. A storage medium as defined in claim 38 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

40. A storage medium as defined in claim 31 wherein the output pixel determined for each input pixel if the difference between that input pixel's maximum and average component values exceeds the predetermined minimum results from adding to that input pixel's non-maximum component values respective adjustment values that in total are a function only of the difference value computed for that input pixel.

41. For operating a printing mechanism to render a source image, an method comprising the steps of:

A) in response to fidelity-correction table signals, generating composite-correction table signals by performing a sequence of at least one entry-replacement operation, in which sequence each entry-replacement operation receives input table signals associated therewith and produces output table signals associated therewith, the input table signals associated with the first entry-replacement operation's are the fidelity-correction table signals, the input table signals associated with any subsequent entry-replacement operation are the output table signals associated with the preceding entry-replacement operation, the input and output table signals respectively define input and output look-up tables associated with the entry-replacement operations with which the input and output table signals that define them are associated, the look-up tables associate table entries with respective table-addressing color values, one said entry-replacement operation is a total-ink-limiting operation, the entries in the input and output look-up tables associated with the total-ink-limiting operation are expressed as RGB-domain color values, the difference between the maximum and average component values of at least one of the table entries of the input look-up table associated with the ink-limiting operation exceeds a predetermined minimum, and the value that the output table associated with the total-ink-limiting operation associates with each table-addressing value:

i) equals the value of the table entry that the input table associated with the total-ink-limiting operation associates with that table-addressing value if the difference between that input-table entry's maximum and average component values does not exceed the predetermined minimum, and, ii) if the difference between that input table entry's maximum and average component values exceeds the predetermined minimum, results from adding to that input table entry's non-maximum component values respective adjustment values that in total are a function of the difference between that input-table entry's maximum and average component values;

B) in response to electrical source-image signals representing a source image consisting of pixels having pixel values, generating electrical print-command signals by employing a sequence of at least one image-revision step, in which sequence each image-revision step receives an input image consisting of pixels having pixel values and produces therefrom an output image consisting of pixels having pixel values, the first image-revision step's input image is the source image, any subsequent image-revision step's input image is the output image of the preceding image-revision step, and one said image-revision step is a composite-correction step that produces its output image by replacing the value of each pixel in its input image with the value that the composite-correction table associates therewith; and C) applying the print-command signals to the printing mechanism.

42. A method as defined in claim 41 wherein:

A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and B) the single-ink-limiting step comprises producing an output image consisting of output pixels whose values are represented by RGB components that are all greater than or equal to the predetermined lower limit.

43. A method as defined in claim 41 wherein the value that the output table associated with the total-ink-limiting operation associates with each table-addressing value results from adding the same adjustment value to both of the non-maximum components of the table entry that the input table associated with the total-ink-limiting operation associates with that table-addressing value.

44. A method as defined in claim 43 wherein the maximum component of the value that the output table associated with the total-ink-limiting operation associates with each table-addressing value equals the maximum component of the value of the table entry that the input table associated with the total-ink-limiting operation associates with that table-addressing value.

45. A method as defined in claim 44 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

46. A method as defined in claim 44 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

47. A method as defined in claim 41 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

48. A method as defined in claim 47 wherein the linear function of the predetermined minimum difference value is zero.

49. A method as defined in claim 48 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

50. A method as defined in claim 41 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

51. For operating a printing mechanism to render a source image, an apparatus comprising:

A) look-up-table-modification circuitry, responsive to fidelity-correction table signals, for generating composite-correction table signals by performing a sequence of at least one entry-replacement operation, in which sequence each entry-replacement operation receives input table signals associated therewith and produces output table signals associated therewith, the input table signals associated with the first entry-replacement operation's are the fidelity-correction table signals, the input table signals associated with any subsequent entry-replacement operation are the output table signals associated with the preceding entry-replacement operation, the input and output table signals respectively define input and output look-up tables associated with the entry-replacement operations with which the input and output table signals that define them are associated, the look-up tables associate table entries with respective table-addressing color values, one said entry-replacement operation is a total-ink-limiting operation, the entries in the input and output look-up tables associated with the total-ink-limiting operation are expressed as RGB-domain color values, the difference between the maximum and average component values of at least one of the table entries of the input look-up table associated with the ink-limiting operation exceeds a predetermined minimum, and the value that the output table associated with the total-ink-limiting operation associates with each table-addressing value:
  i) equals the value of the table entry that the input table associated with the total-ink-limiting operation associates with that table-addressing value if the difference between that input-table entry's maximum and average component values does not exceed the predetermined minimum, and,
  ii) if the difference between that input table entry's maximum and average component values exceeds the predetermined minimum, results from adding to that input table entry's non-maximum component values respective adjustment values that in total are a function of the difference between that input-table entry's maximum and average component values;

B) image-revision circuitry responsive to the composite-correction table signals and electrical source-image signals representing a source image consisting of pixels having pixel values for performing a sequence of at least one image-revision step, in which sequence each image-revision step receives an input image consisting of pixels having pixel values and produces therefrom an output image consisting of pixels having pixel values, the first image-revision step's input image is the source image, any subsequent image-revision step's input image is the output image of the preceding image-revision step, and one said image-revision step is a composite-correction step that produces its output image by replacing the value of each pixel in its input image with the value that the composite-correction table associates therewith; and C) output circuitry responsive to the image-revision circuitry for applying to the printing mechanism electrical print-command signals that represent the output image produced by the last said image-revision step.

52. An apparatus as defined in claim 51 wherein:
A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and
B) the single-ink-limiting step comprises producing an output image consisting of output pixels whose values are represented by RGB components that are all greater than or equal to the predetermined lower limit.

53. An apparatus as defined in claim 51 wherein the value that the output table associated with the total-ink-limiting operation associates with each table-addressing value results from adding the same adjustment value to both of the non-maximum components of the table entry that the input table associated with the total-ink-limiting operation associates with that table-addressing value.

54. An apparatus as defined in claim 53 wherein the maximum component of the value that the output table associated with the total-ink-limiting operation associates with each table-addressing value equals the maximum component of the value of the table entry that the input table associated with the total-ink-limiting operation associates with that table-addressing value.

55. An apparatus as defined in claim 54 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

56. An apparatus as defined in claim 54 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

57. An apparatus as defined in claim 51 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

58. An apparatus as defined in claim 57 wherein the linear function of the predetermined minimum difference value is zero.

59. An apparatus as defined in claim 58 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

60. An apparatus as defined in claim 51 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

61. A printing apparatus comprising:
A) a printing mechanism responsive to electrical print-command signals applied thereto to apply ink to a medium in accordance with the print-command signals;
B) look-up-table-modification circuitry, responsive to fidelity-correction table signals, for generating composite-correction table signals by performing a sequence of at least one entry-replacement operation, in which sequence each entry-replacement operation receives input table signals associated therewith and produces output table signals associated therewith, the input table signals associated with the first entry-replacement operation's are the fidelity-correction table signals, the input table signals associated with any subsequent entry-replacement operation are the output table signals associated with the preceding entry-replacement operation, the input and output table signals respectively define input and output look-up tables associated with the entry-replacement operations with which the input and output table signals that define them are associated, the look-up tables associate table entries with respective table-addressing color values, one said entry-replacement operation is a total-ink-limiting operation, the entries in the input and output look-up tables associated with the total-ink-limiting operation are expressed as RGB-domain color values, the difference between the maximum and average component values of at least one of the table entries of the input look-up table associated with the ink-limiting operation exceeds a predetermined minimum, and the value that the output table associated with the total-ink-limiting operation associates with each table-addressing value:

i) equals the value of the table entry that the input table associated with the total-ink-limiting operation associates with that table-addressing value if the difference between that input-table entry's maximum and average component values does not exceed the predetermined minimum, and, ii) if the difference between that input table entry's maximum and average component values exceeds the predetermined minimum, results from adding to that input table entry's non-maximum component values respective adjustment values that in total are a function of the difference between that input-table entry's maximum and average component values;

C) image-revision circuitry responsive to the composite-correction table signals and electrical source-image signals representing a source image consisting of pixels having pixel values for performing a sequence of at least one image-revision step, in which sequence each image-revision step receives an input image consisting of pixels having pixel values and produces therefrom an output image consisting of pixels having pixel values, the first image-revision step's input image is the source image, any subsequent image-revision step's input image is the output image of the preceding image-revision step, and one said image-revision step is a composite-correction step that produces its output image by replacing the value of each pixel in its input image with the value that the composite-correction table associates therewith; and D) output circuitry responsive to the image-revision circuitry for applying to the printing mechanism electrical print-command signals that represents the output image produced by the last said image revision step.

62. A printing apparatus as defined in claim 61 wherein:

A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and B) the single-ink-limiting step comprises producing an output image consisting of output pixels whose values are represented by RGB components that are all greater than or equal to the predetermined lower limit.

63. A printing apparatus as defined in claim 61 wherein the value that the output table associated with the total-ink-limiting operation associates with each table-addressing value results from adding the same adjustment value to both of the non-maximum components of the table entry that the input table associated with the total-ink-limiting operation associates with that table-addressing value.

64. A printing apparatus as defined in claim 63 wherein the maximum component of the value that the output table associated with the total-ink-limiting operation associates with each table-addressing value equals the maximum component of the value of the table entry that the input table associated with the total-ink-limiting operation associates with that table-addressing value.

65. A printing apparatus as defined in claim 64 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

66. A printing apparatus as defined in claim 64 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

67. A printing apparatus as defined in claim 61 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

68. A printing apparatus as defined in claim 67 wherein the linear function of the predetermined minimum difference value is zero.

69. A printing apparatus as defined in claim 68 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

70. A printing apparatus as defined in claim 61 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

71. A storage medium containing instructions readable by a computer to configure the computer to function as printer driver for operating a printer to render a source image, which printer driver comprises:

A) look-up-table-modification circuitry, responsive to fidelity-correction table signals, for generating composite-correction table signals by performing a sequence of at least one entry-replacement operation, in which sequence each entry-replacement operation receives input table signals associated therewith and produces output table signals associated therewith, the input table signals associated with the first entry-replacement operation's are the fidelity-correction table signals, the input table signals associated with any subsequent entry-replacement operation are the output table signals associated with the preceding entry-replacement operation, the input and output table signals respectively define input and output look-up tables associated with the entry-replacement operations with which the input and output table signals that define them are associated, the look-up tables associate table entries with respective table-addressing color values, one said entry-replacement operation is a total-ink-limiting operation, the entries in the input and output look-up tables associated with the total-ink-limiting operation are expressed as RGB-domain color values, the difference between the maximum and average component values of at least one of the table entries of the input look-up table associated with the ink-limiting operation exceeds a predetermined minimum, and the value that the output table associated with the total-ink-limiting operation associates with each table-addressing value:

i) equals the value of the table entry that the input table associated with the total-ink-limiting operation associates with that table-addressing value if the difference between that input-table entry's maximum and average component values does not exceed the predetermined minimum, and, ii) if the difference between that input table entry's maximum and average component values exceeds the predetermined minimum, results from adding to that input table entry's non-maximum component values respective adjustment values that in total are a function of the difference between that input-table entry's maximum and average component values; and B) image-revision circuitry responsive to the composite-correction table signals and electrical source-image signals representing a source image consisting of pixels having pixel values for performing a sequence of at least one image-revision step, in which sequence each image-revision step receives an input image consisting of pixels having pixel values and produces therefrom an output image consisting of pixels having pixel values, the first image-revision step's input image is the source image, any subsequent image-revision step's input image is the output image of the preceding image-revision step, and one said image-revision step is a composite-correction step that produces its output image by replacing the value of each pixel in its input image with the value that the composite-correction table associates therewith; and C) output circuitry responsive to the image-revision circuitry for applying to the printing mechanism electrical print-command signals that represents the output image produced by the last said image revision step.

72. A storage medium as defined in claim 71 wherein:

A) one said image-revision step is a single-ink-limiting step that precedes the total-ink-limiting step, the input image of the single-ink-limiting step consisting of input pixels whose values are represented by RGB components, a component value of at least one of the input pixels of the single-ink-limiting step's input image being less than a predetermined lower limit; and B) the single-ink-limiting step comprises producing an output image consisting of output pixels whose values are represented by RGB components that are all greater than or equal to the predetermined lower limit.

73. A storage medium as defined in claim 71 wherein the value that the output table associated with the total-ink-limiting operation associates with each table-addressing value results from adding the same adjustment value to both of the non-maximum components of the table entry that the input table associated with the total-ink-limiting operation associates with that table-addressing value.

74. A storage medium as defined in claim 73 wherein the maximum component of the value that the output table associated with the total-ink-limiting operation associates with each table-addressing value equals the maximum component of the value of the table entry that the input table associated with the total-ink-limiting operation associates with that table-addressing value.

75. A storage medium as defined in claim 74 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

76. A storage medium as defined in claim 74 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

77. A storage medium as defined in claim 71 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a linear function of the difference between that input-table entry's maximum and average component values.

78. A storage medium as defined in claim 77 wherein the linear function of the predetermined minimum difference value is zero.

79. A storage medium as defined in claim 78 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and aver age component values.

80. A storage medium as defined in claim 71 wherein the value that the output table associated with the total-ink-limiting operation associates with each table-addressing value if the difference between that input table entry's maximum and average component values exceeds the predetermined minimum results from adding to that input table entry's non-maximum component values respective adjustment values that in total are a function only of the difference between that input-table entry's maximum and average component values.

* * * * *